United States Patent [19]

Rabe et al.

[11] Patent Number: 5,232,487
[45] Date of Patent: Aug. 3, 1993

[54] METHOD OF SIMULTANEOUS DISPOSAL OF SOLID AND LIQUID WASTES

[75] Inventors: Wolfgang Rabe, Bernsdorf; Lutz Gröschel, Hoyerswerda; Karl Sowka, Dörgenhausen; Günter Scholz, Hoyerswerda; Roland Weber, Hoyerswerda; Horst Burkhardt, Hoyerswerda; Dieter Mergemeier, Hoyerswerda; Manfred Langner, Hoyerswerda, all of Fed. Rep. of Germany

[73] Assignee: Energiewerke Schwarze Pumpe Aktiengesellschaft, Schwarze Pumpe, Fed. Rep. of Germany

[21] Appl. No.: 902,664

[22] Filed: Jun. 19, 1992

[30] Foreign Application Priority Data

Aug. 1, 1991 [DE] Fed. Rep. of Germany ....... 4125517

[51] Int. Cl.⁵ .............................................. C22B 7/00
[52] U.S. Cl. ......................................... 75/414; 75/401; 75/403
[58] Field of Search .......................... 75/401, 403, 414

[56] References Cited

U.S. PATENT DOCUMENTS

| | | | |
|---|---|---|---|
| 3,598,649 | 8/1971 | Juhasz | 75/403 |
| 3,996,044 | 12/1976 | Petritsch | 75/403 |
| 4,032,361 | 6/1977 | Eriksson | 75/403 |
| 4,415,360 | 11/1983 | Leirnes | 75/403 |

Primary Examiner—Peter D. Rosenberg
Attorney, Agent, or Firm—Michael J. Striker

[57] ABSTRACT

A method of simultaneous disposal of liquid and solid wastes comprises the steps of introducing liquid and solid wastes into a gasification reactor with a cooled reactor inner wall and liquid slag discharge and gasifying the liquid and solid wastes at a temperature which is at least 50° C. higher than a melting temperature of mineral components of the solid wastes with a dwelling time of a produced gas in the gasification reactor more than 2 seconds.

2 Claims, 1 Drawing Sheet

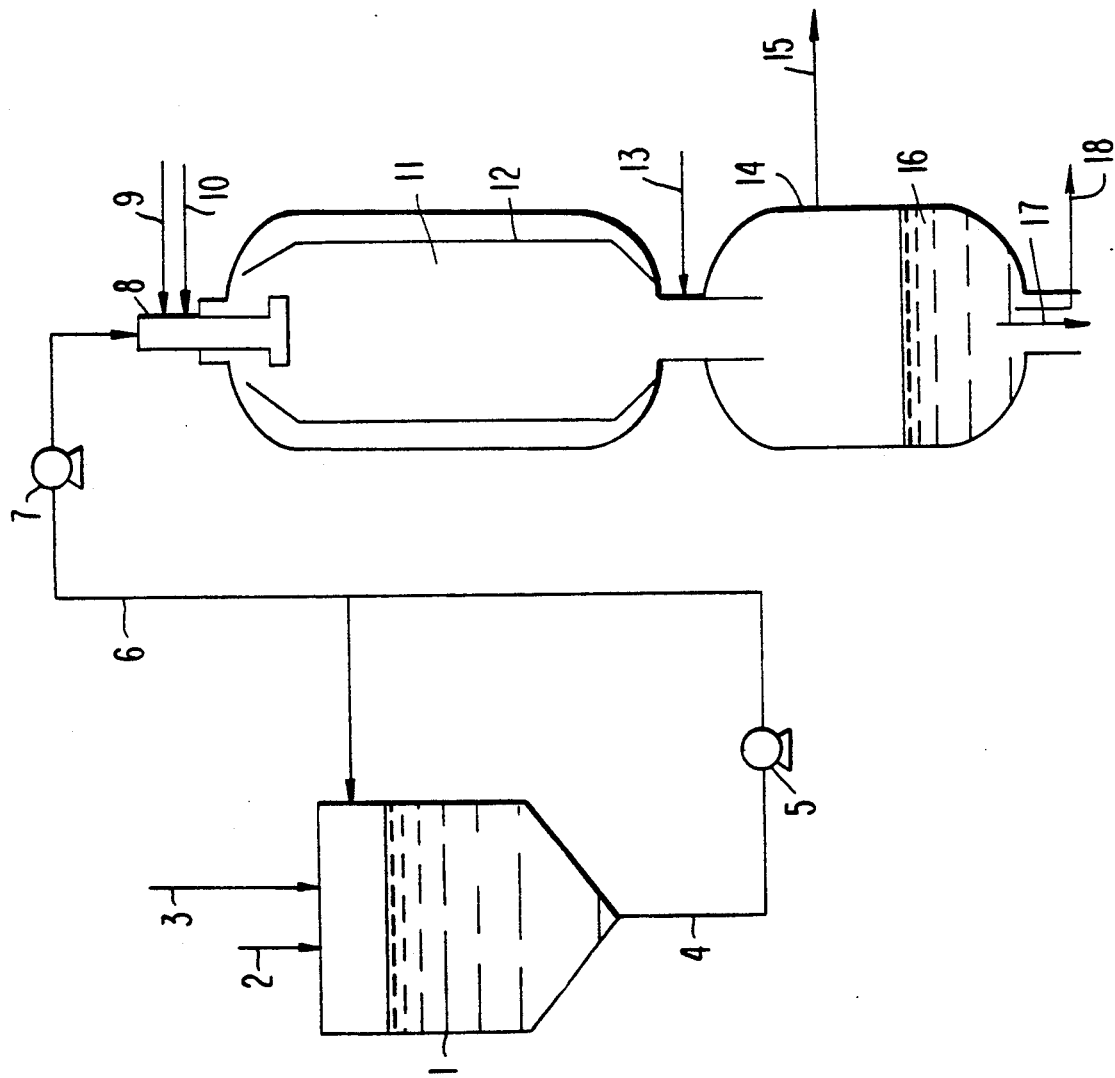

METHOD OF SIMULTANEOUS DISPOSAL OF SOLID AND LIQUID WASTES

BACKGROUND OF THE INVENTION

The present invention relates to a method of simultaneous disposal of solid and liquid wastes.

Special wastes are wastes from industrial and similar enterprises and public appliances, which according to their type, property or quantity are especially health, air or water hazardous. The gravest special wastes are produced in the chemical industry, in the metal working industry as well as in energy and waste processing industry. In the chemical industry, mainly sulfur containing, hydrocarbon containing and halogenated wastes are produced. In the metal working industry among others oil emulsions, varnish slurries and galvanic wastes are produced. In thermal waste processing devices such as combustion and pyrolysis, partially loaded residual material, and in the region of heat utilization and the gas cleaning flue and filter dust precipitate, and their disposal poses great problems. Especially the contamination of this dust with organic pollutants such as dioxine and furane as well as with heavy metals causes significant environmental problems in the case of their storage.

Presently for this and similar special wastes some solutions have been proposed which include binding in clay containing materials such as disclosed in German document DE PS 3,918,259 DE PS 3,713,482, DE PS 3,919,011 or processing heavy metal-containing residues in accordance with the German document DE PS 3,502,215 to solid storageable products which then can be stored with very high expenses in underground storage facilities. Alternative solutions include melting. Such solutions are disclosed for example in the patent document DD PS 3,939,344, DE PS 3,206,984. The devices disclosed in these references require very high energy consumption. They are presently in the stage of laboratory and pilot devices and require significant development and time expenses for their implementation in practice. From the gasification technique also a proposal disclosed in the patent document DD 267,880 is known. In accordance with this proposal an ash containing liquid fuel is loaded separately and independently from the burner with a dust like fuel and supplied with water vapor through a supply conduit into a reaction chamber. The required oxygen for autothermic partial oxidation of the ash containing liquid fuel is supplied through the coal dust burner of the gasification reactor. The gasification of liquid residues is performed in accordance with this process with a high introduction of coal dust which use leads to high production cost. The quantity of liquid residues to be added in this process is very limited.

SUMMARY OF THE INVENTION

Accordingly, it is an object of the present invention to provide a method in accordance with which liquid and solid wastes are simultaneously disposed by the process of gasification in efficient and environmentally relevant way.

In keeping with these objects and with others which will become apparent hereinafter, one feature of the present invention resides, briefly stated, in a method of simultaneous disposal of solid and liquid wastes in a gasification process which involves a flow gasification with a reactor inner wall as cooled tubular screen, with liquid slag discharge and shock-like cooling of the produced slag containing gas to less than 200° C., wherein in accordance with the present invention the liquid wastes which have a caloric value greater than 2,000 kJ/kg and which contain hydrocarbons and/or sulfur and/or PCB and heavy metals and/or dioxine and in addition 3-35% wastes as solid components with fraction of greater than 10% of mineral components and sulfur and/or heavy metals and/or PCB and/or dioxine and furane and/or hydrocarbons are gasified at a reaction temperature which is adjusted to 50° C. above the melting temperature of the mineral components of the solid wastes and therefore to more than 1,200° C. and the dwelling time of the produced gases at the reaction temperature of more than 1,200° C. in the gasification reactor amounts to more than 2 seconds.

When the method is performed in accordance with the present invention it eliminated the disadvantages of the prior art and provides for the above mentioned objects.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically illustrating a method of simultaneous disposal of solid and liquid wastes in accordance with the present invention.

DESCRIPTION OF THE PREFERRED EMBODIMENTS

In accordance with the present invention liquid wastes with a caloric value greater than 2,000 kJ/kg and with hydrocarbons and/or sulfur and/or PCB and heavy metals, and/or dioxine and in addition 3-35% of wastes as solid components are introduced into a flow gasifier whose reaction inner wall is formed as a cooled tubular screen and through which a liquid slag discharge flows. The solid wastes have more than 10% of mineral components and sulfur and/or heavy metals and/or PCB and/or dioxine and/or hydrocarbons. The grain size of the solid wastes amount to preferably less than 0.5 mm during performance of the inventive method. The inventive method is performed at a reaction temperature which is above 50° C. of the melting temperature of the mineral components of the solid wastes and therefore is adjusted to at least more than 1,200° C. The dwelling time of the produced gas at the adjusted reaction temperature amounts to more than 2 seconds before a shock-like cooling of the produced slag-containing gas to less than 200° C.

For the inventive method the used materials for the simultaneous disposal of liquid and solid wastes can include for example pollutant-loaded waste oils in mixture with varnish slurries, sewage slurries or flue and filter dust from waste gas cleaning devices. It is also possible to use only solid-containing pitches from the coal conversion and mineral oil industry.

The advantage of the method in accordance with the present invention is especially that simultaneously liquid and solid wastes can be disposed in one process step, and with the reaction heat produced during the disposal of the liquid waste the solid wastes can be disposed and therefore the heavy metals of the liquid wastes can be bonded in the mineral components of the solid wastes without eluting.

An example of the inventive method is presented hereinbelow and illustrated in the drawing.

In a tank system 1 waste oil 2 with a caloric value of 33,000 kJ/kg and with the following contaminant components:
PCB—200 mg/kg
Ni—2,000 mg/kg
Pb—2,000 mg/kg
Zn—2,500 mg/kg
S—4%
with 0.1 kg of 15% of water content dried sewage slurry/kg waste oil which contains 10% mineral components and following contaminant composition:
Pb: 1,000 mg/kg
Cu: 500 mg/kg
Zn: 2,000 mg/kg
and also 0.15 kg filter dust from the cleaning stage of refuse combustion waste gases/kg waste oil which contains 60% mineral component and following contaminant components:

| 200 mg PC DD and | PC DR/g |
|---|---|
| 6,000 mg Pb | /kg |
| 24,000 mg Zn | /kg |
| 1,000 mg Cu | /kg |
| 1,700 mg Sn | /kg |
| 1,400 mg Cr | /kg | are mixed.

This waste oil-waste mixture is circulated by a circulating system 4 and a pump 5 to prevent deposits. 12 t/h of the waste oil-waste mixture is supplied by a branch conduit 6 and a dosing pump 7 through a burner 8 into a gasification reactor 11. The gasification reactor operates with a pressure of 25 bar, has a volume of 30 m$^3$, and its reaction chamber contour 12 is positively cooled. The high pressure steam supplied in the quantity of 4 t/h serves both for whirling the waste oil-waste mixture and also as a gasification medium. By means of the oxygen quantity of 10,000 m$^3$ i.N./h the autothermic partial oxidation of the waste oil and the organic components of the solid wastes is performed. The melting point of the mineral components of the solid wastes lies at 1,250° C. Gas outlet temperature is adjusted to 1,400° C. by the flame reaction. During the gasification reaction 40,000 m$^3$ i.N. of crude gas/h is produced. The average dwelling time in the gasification reactor amounts to 2.7 seconds.

Quenching at 13 of the crude gas which transports the produced slag in liquid form performs the cooling of the crude gas to 200° C. and the granulation of the slag 17 which is discharged from a quenching container 14 through a water bath 16. The heavy metal components of the wastes are non-elutably melted in the slag. The slag can be used as structural material or stored with no danger. The soot water 18 produced in the quenching container 14 is tar, oil, phenol and PCB free and does not need further processing. The cooled crude gas 15 contains no traceable dioxine quantities and is used after a desulfurization as a combustion gas for conversion.

It will be understood that each of the elements described above, or two or more together, may also find a useful application in other types of methods differing from the types described above.

While the invention has been illustrated and described as embodied in a method of simultaneous disposal of solid and liquid wastes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method of simultaneous disposal of liquid and solid wastes in a gasification process with a flow gasification using a reaction inner wall as a cooled tubular screen, with liquid slag discharge and shock-like cooling of a produced slag-containing gas to less than 200° C., the method comprising the steps of introducing in a gasification reactor liquid wastes which have a coloric value of greater than 2,000 kJ/kg and contain a material selected from the group consisting of hydrocarbon, sulfur PCB and heavy metal, and dioxine, together with 3–35% solid wastes with fraction of greater than 10% of mineral components and a substance selected from the group consisting of sulfur, heavy metal, PCB, dioxine and furane, and hydrocarbon; gasifying the liquid wastes with the solid wastes at a reaction temperature which is at least 50° C. above a melting temperature of the mineral components of the solid wastes and is more than 1,200° C.; and providing a dwelling time of the gas produced in the gasification reactor at the reaction temperature of more than 1,200° C. in the gasification reactor more than 2 seconds.

2. A method of simultaneous disposal of liquid and solid wastes, comprising the steps of introducing liquid and solid wastes into a gasification reactor with a cooled reactor inner wall and liquid slag discharge; and gasifying the liquid and solid wastes at a temperature which is at least 50° C. higher than a melting temperature of mineral components of the solid wastes with a dwelling time of a produced gas in the gasification reactor more than 2 seconds.

* * * * *